Figure 1:
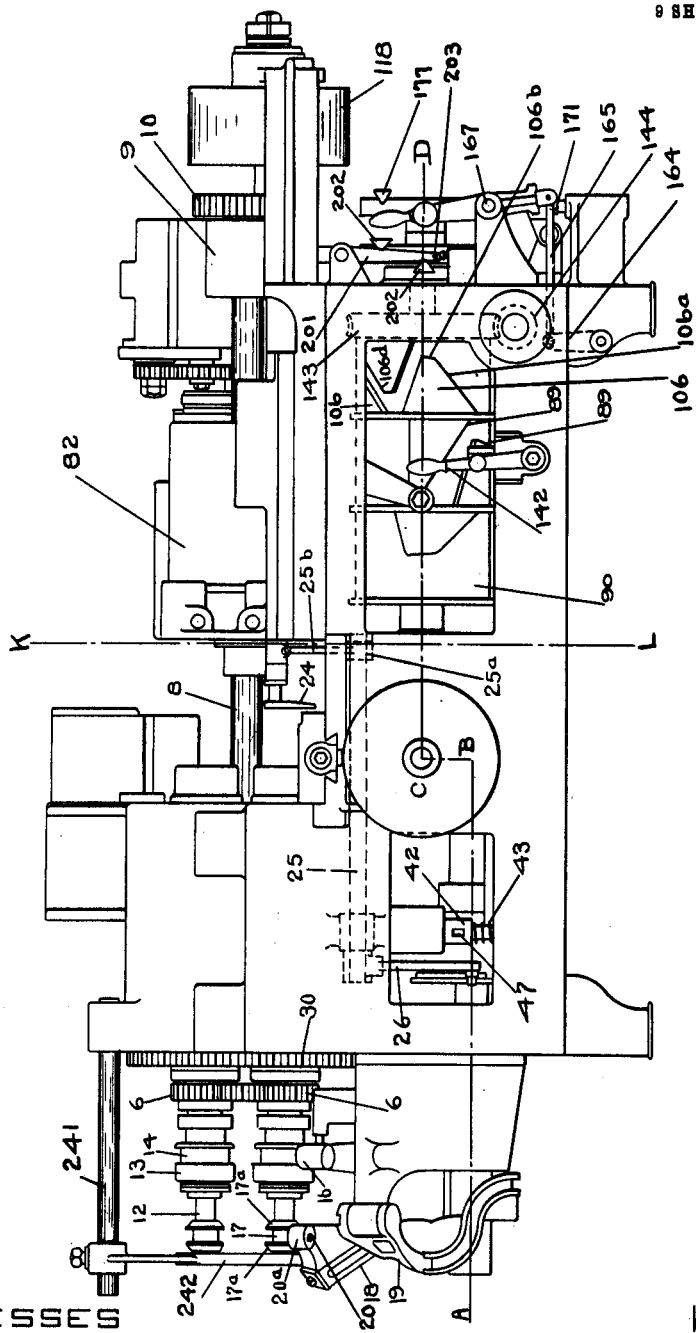

G. H. NEWTON.
SCREW MACHINE.
APPLICATION FILED OCT. 18, 1909.

1,066,036.

Patented July 1, 1913.
9 SHEETS—SHEET 1.

WITNESSES
J. L. Thurston
E. G. Bradley.

INVENTOR
George H. Newton,
By Wilmarth H. Thurston,
Attorney.

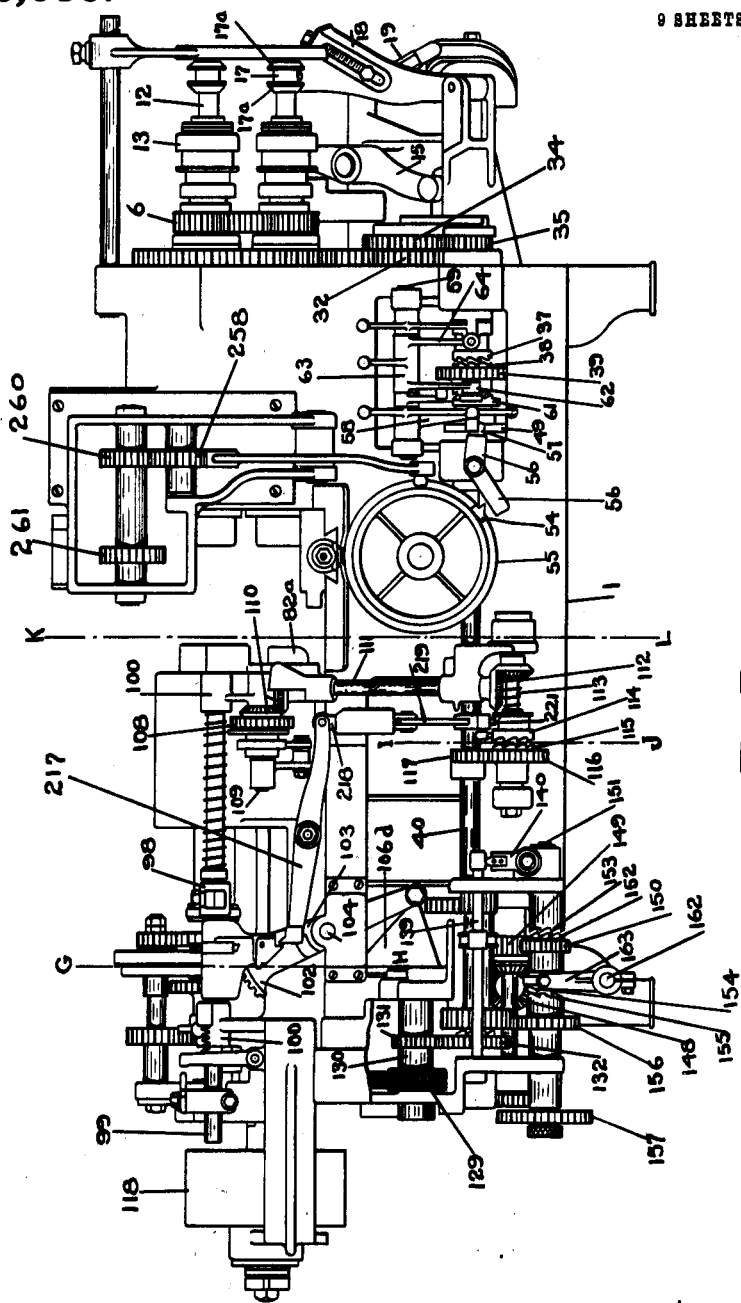

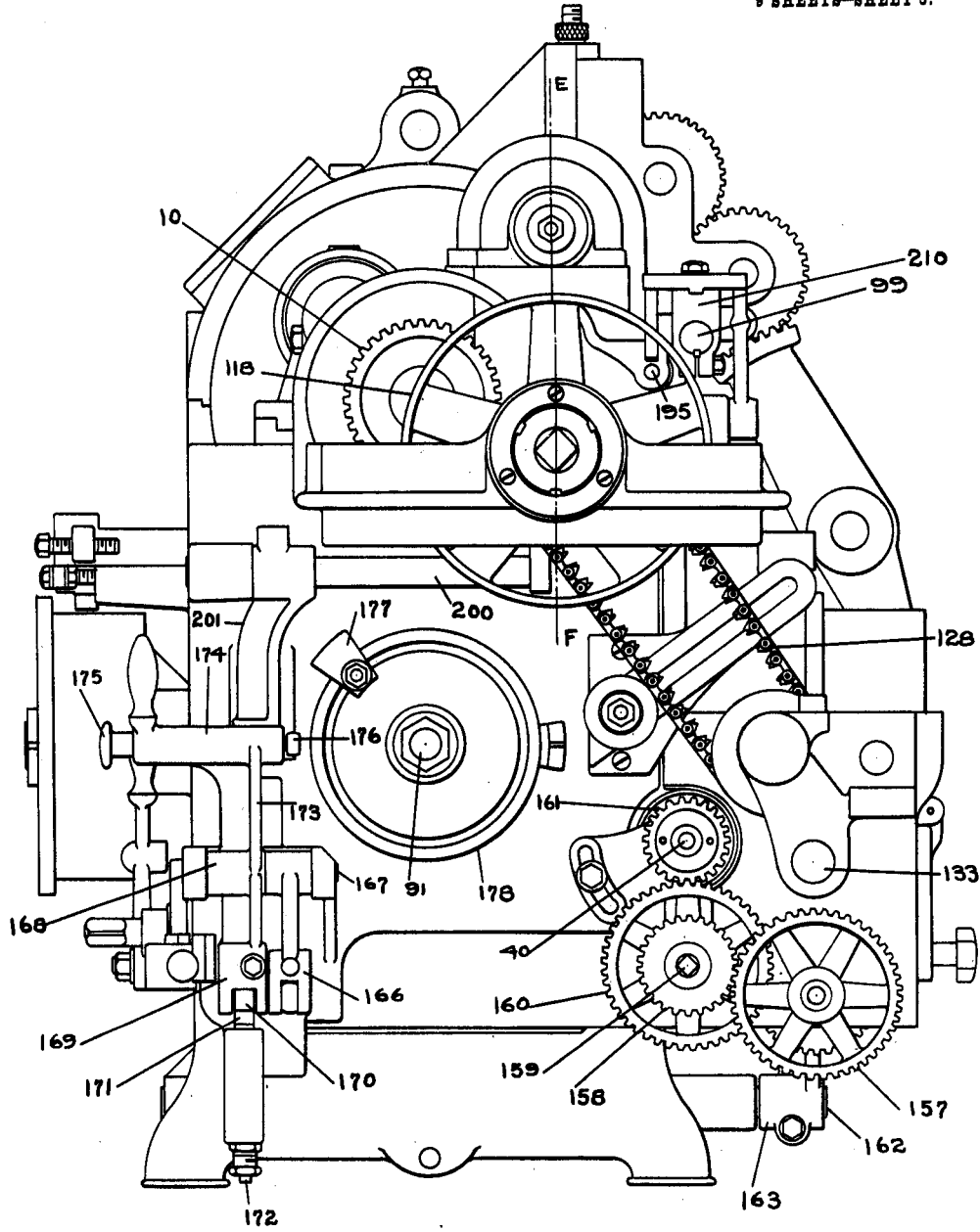

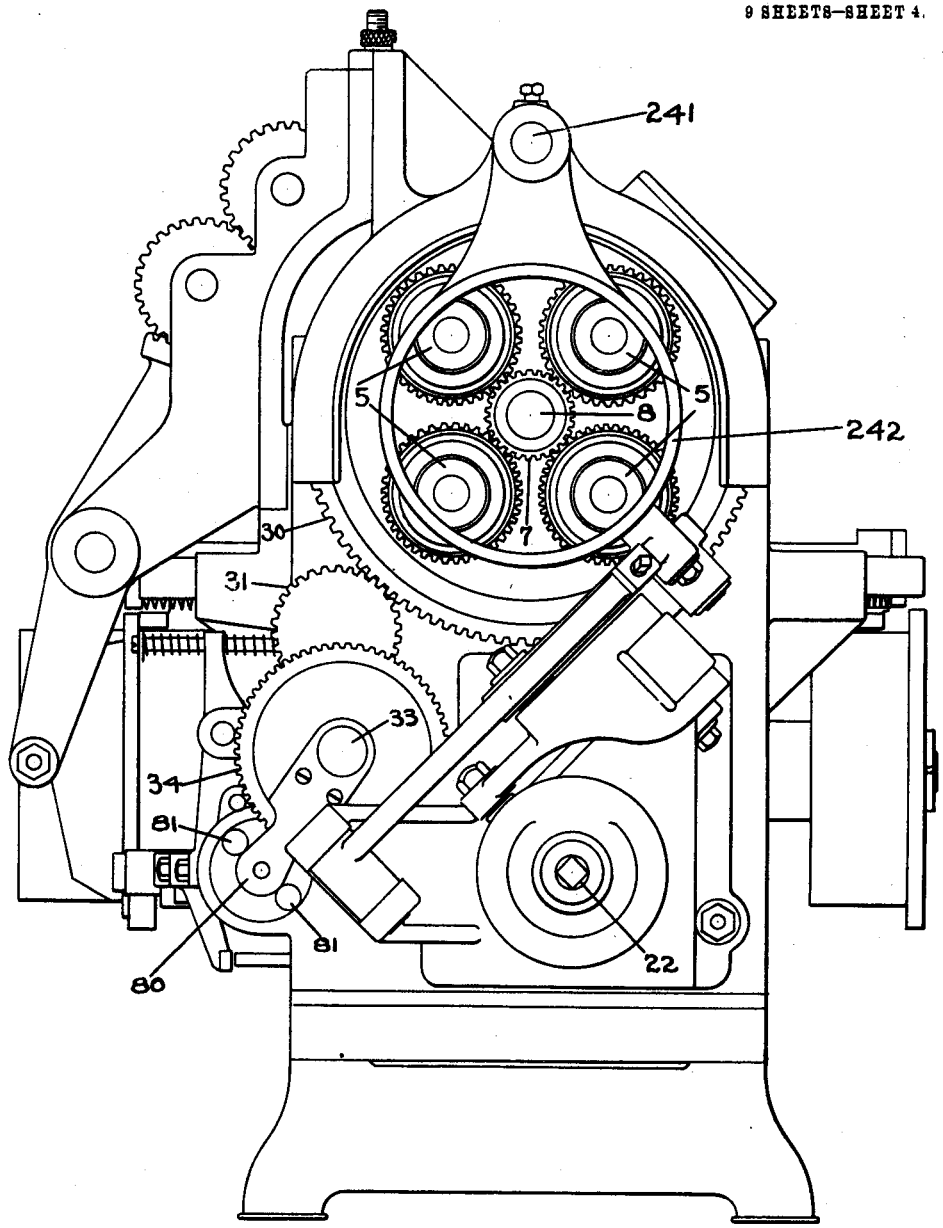

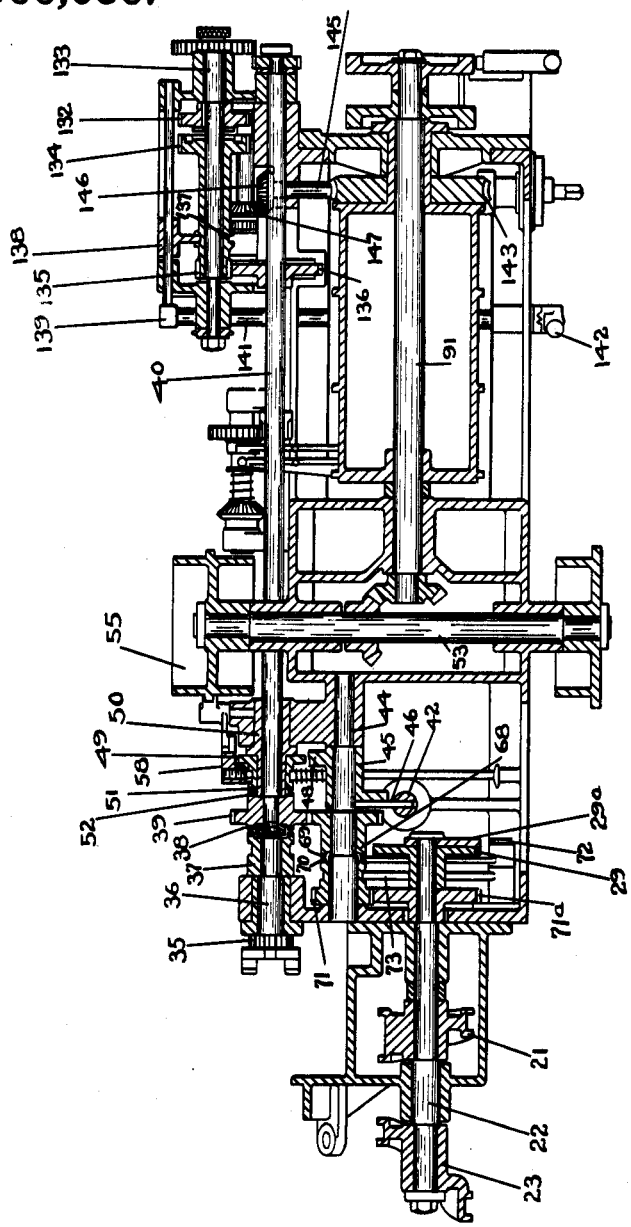

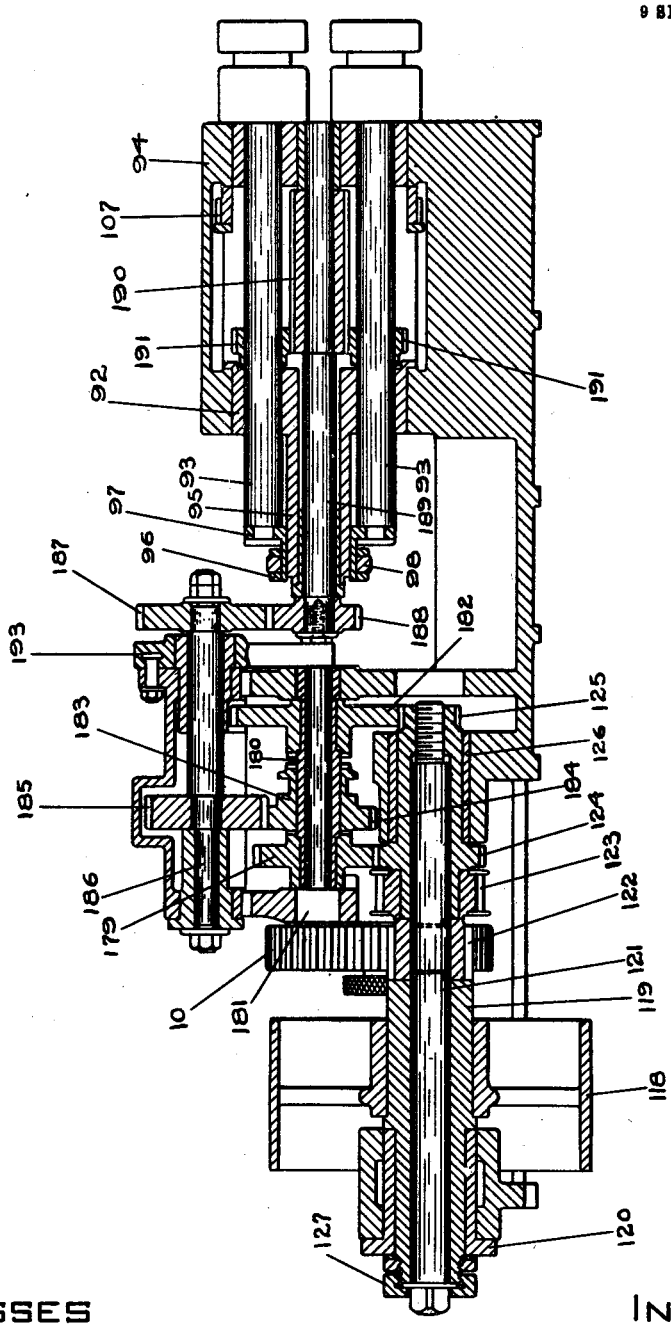

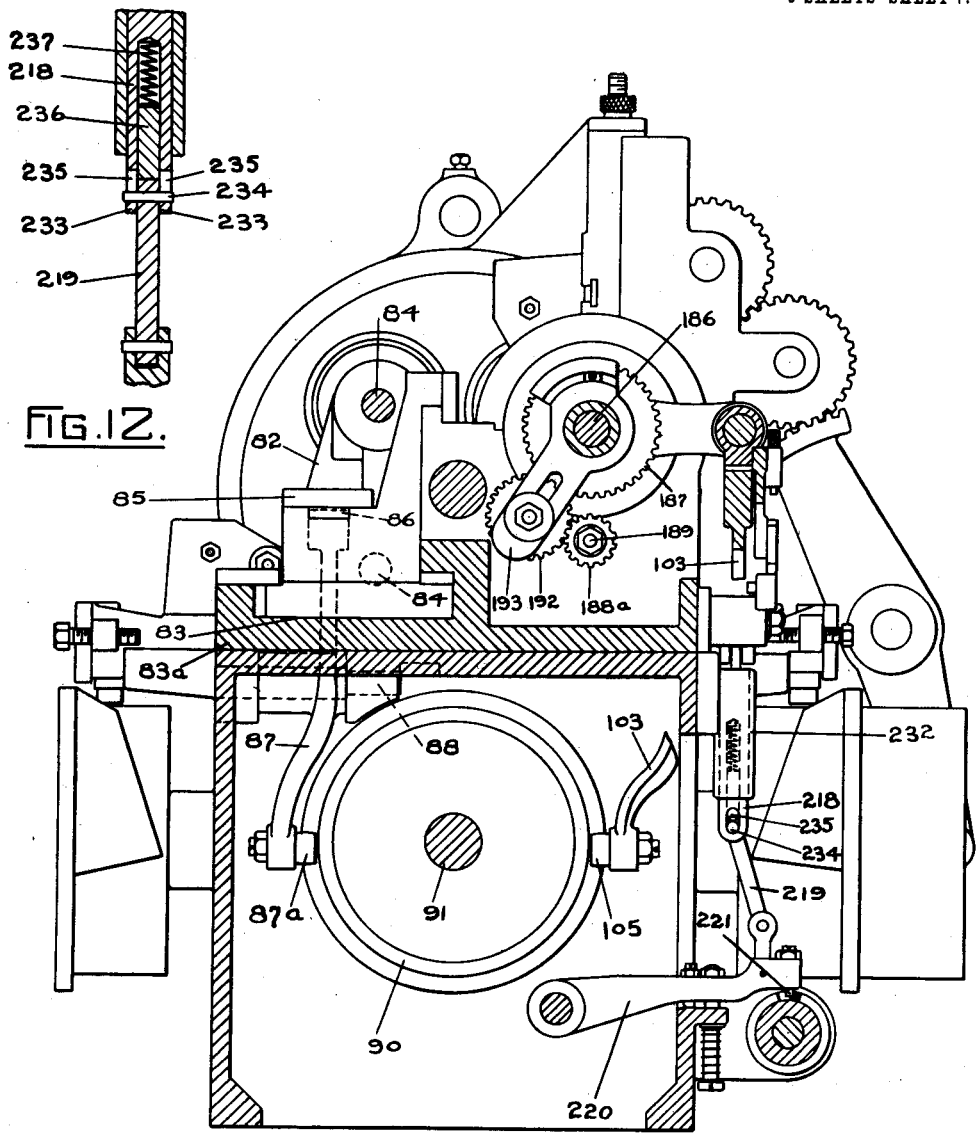

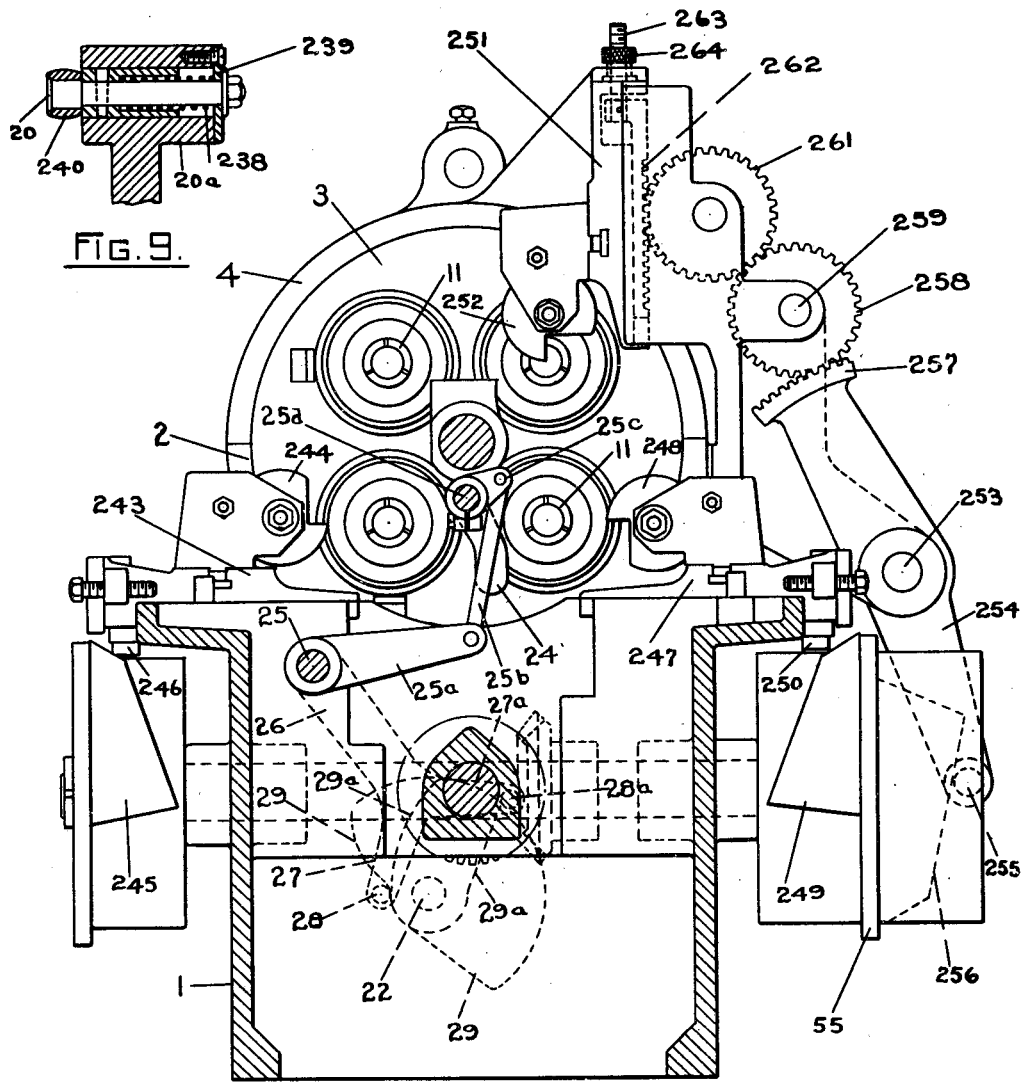

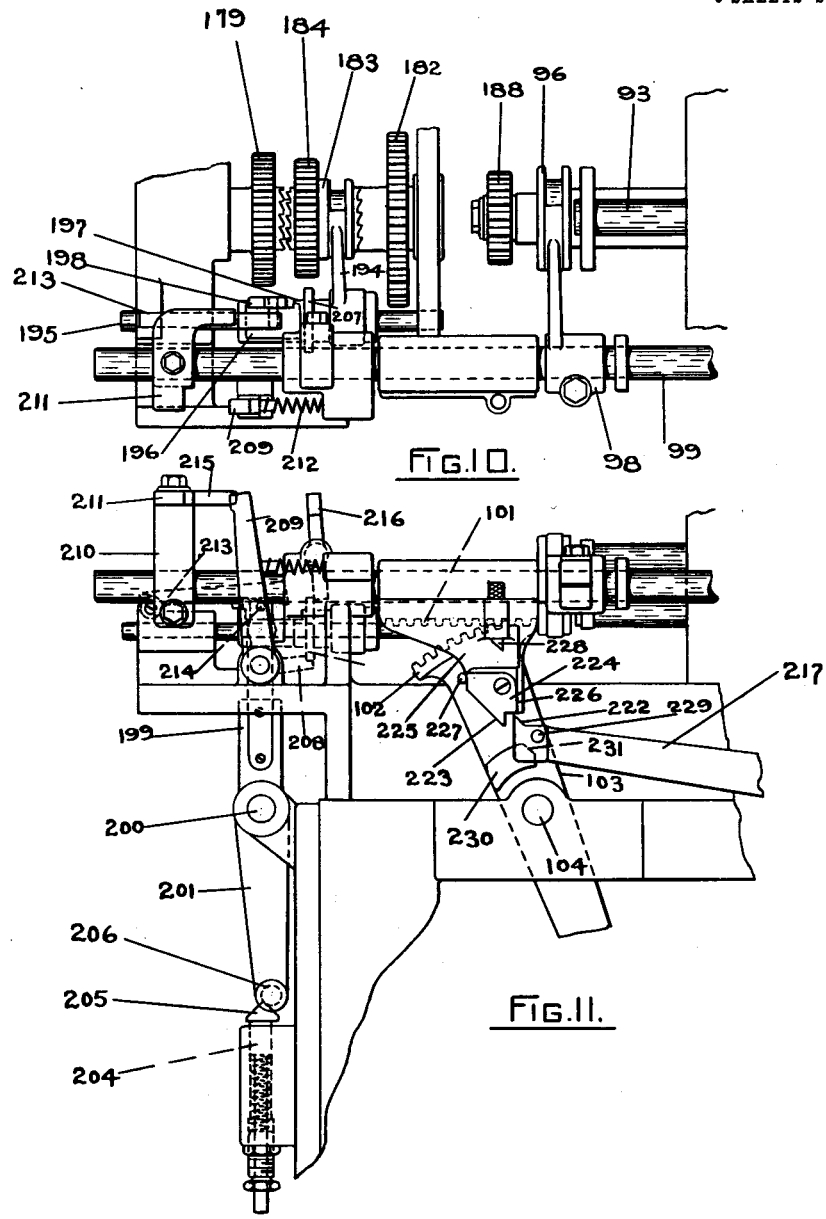

UNITED STATES PATENT OFFICE.

GEORGE H. NEWTON, OF PROVIDENCE, RHODE ISLAND, ASSIGNOR TO BROWN & SHARPE MANUFACTURING COMPANY, OF PROVIDENCE, RHODE ISLAND, A CORPORATION OF RHODE ISLAND.

SCREW-MACHINE.

1,066,036.        Specification of Letters Patent.        Patented July 1, 1913.

Application filed October 18, 1909. Serial No. 523,148.

*To all whom it may concern:*

Be it known that I, GEORGE H. NEWTON, of the city and county of Providence and State of Rhode Island, have invented certain new and useful Improvements in Screw-Machines; and I do hereby declare the following specification, taken in connection with the accompanying drawings, forming a part of the same, to be a full, clear, and exact description thereof.

The invention relates more particularly to that class of screw machines in which a series of work-holding spindles is employed, mounted in a turret, whereby several rods of stock may be simultaneously operated upon by a series of tools, and whereby by indexing said turret each rod of stock will be presented to and operated upon by each of said tools successively.

The object of the invention is to simplify and improve the construction and to increase the capacity and output of machines of this class, and at the same time to provide a machine which shall be fully automatic in its operation and which may be readily adapted for the performance of a wide range of work.

In machines of the character referred to, as heretofore constructed two driving shafts have been commonly employed, one for operating certain portions of the machine, as for example rotating the work-spindles, and the other for operating other portions of the machines, as for example the cam-shaft, the tool-carriages, and the die-spindles. In such machines as ordinarily constructed no provision was made within the machine for varying the speed of the different operating parts, but any change of speed involved a shifting of the belts on the pulleys on the overhead countershafts.

In machines of this character there are two kinds of speed-changing which it is desirable should be provided for. Thus in some cases it is desirable to change the speed of certain parts of the machine, as for example the work-spindles, to adapt the machine to operate upon different materials, such as iron or brass or upon work of different sizes. In such cases the change of speed is to be made in setting up the machine for the particular work to be done, and may therefore be done by hand. In other cases it is desirable that the speed of certain parts of the machine, as for example the feed and return of the tool-carriage or the revolution of the die-spindle, should be effected automatically during the operation of the machine.

One object of the present invention is to provide means within the machine itself for varying or changing the speed of the operating parts. In some cases the change of speed is to be effected by a hand operation and in other cases is to be effected automatically during the operation of the machine.

To that end one feature of the invention consists in the employment of a single constant speed driving shaft for operating the entire machine, and in the combination with such shaft of a train of mechanism leading therefrom to the work-spindles with hand-operated speed changing means in said train, an independent train of mechanism leading from said shaft to the cam-shaft, with both hand-operated speed changing means and automatically-operated speed changing means therein, and another independent train of mechanism leading from said shaft to the die-spindles, with both a hand-operated speed changing means and automatically - operated speed changing means therein.

A further feature of invention consists in leading the work-spindle train from the constant speed driving shaft in advance of the die-spindle train, with separate speed-changing means in each of said trains, the speed-changing means in the die-spindle train being located beyond the die spindle-clutch.

A further feature of invention consists in providing means whereby the indexing of the die-spindle turret is controlled by the longitudinal movement of the die-spindles.

A further feature of invention consists in providing means whereby the feed-lever may be automatically connected with each of the feed-tubes respectively, even if the feed-tube is out of position to be brought into engagement with said feed-lever by the indexing movement of the turret.

A further feature of invention consists in providing an annular member located at the rear of the feed-tubes and adapted to serve as a guard for the rear ends of said feed-tubes and as a guide for determining the rearward movement thereof.

A further feature of invention consists in providing a stop for limiting the forward movement of the rod of stock with means for moving said stop into and out of the path of said rod, said means being constructed to provide a relatively long dwell of said stop in the path of said rod.

A further feature of invention consists in employing two cross-slides carrying tools adapted to operate one on a rod of stock in one indexed position and the other on a rod of stock in another indexed position, with means for operating both of said cross-slides from one and the same cam-drum.

The invention further consists in features of construction and in the combinations and arrangements of parts hereinafter described and claimed.

Referring to the drawings, Figure 1 is a front elevation of the machine. Fig. 2 is a rear elevation. Fig. 3 is an end elevation on an enlarged scale looking at the right hand end of the machine, as shown in Fig. 1. Fig. 4 is an end elevation on an enlarged scale looking at the left hand end of the machine, as shown in Fig. 1. Fig. 5 is a horizontal section on the line A—B—C—D of Fig. 1. Fig. 6 is a vertical longitudinal section on an enlarged scale of the upper portion of the machine on the line E—F of Fig. 3. Fig. 7 is a vertical transverse section on an enlarged scale on the line G—H—I—J of Fig. 2 looking toward the work-spindle end of the machine, with certain of the parts broken away. Fig. 8 is a vertical transverse section on an enlarged scale on the line K—L of Figs. 1 and 2 looking toward the work-spindle end of the machine. Figs. 9 to 12 inclusive are detail views of certain parts of the machine.

The frame 1 is provided at one end with a concave recess 2 in which the spindle-turret 3 is mounted, a cap 4 being secured to the frame to complete the housing for said turret, as shown in Fig. 8. As shown in the drawings, the machine is provided with four work-spindles 5, but the number of work-spindles may be varied if desired. Each of said spindles is provided at its rear end with a gear 6, which gears mesh with a central gear 7 secured to the shaft 8 which extends axially through the work-spindle turret, said spindle-turret constituting the support for said shaft at that end. At its opposite end said shaft 8 is supported in a bearing 9 and is provided at its outer end with a gear 10.

Each of the spindles 5 is provided with a suitable work-holding chuck 11, and also with a feed-tube 12, which as shown are of the usual construction and require no further description. Mounted on each of said spindles 5 is a sliding collar 13 provided with a groove 14 for opening and closing the jaws of the chuck 11 in the usual manner. The chuck-operating lever 15 is suitably mounted so that the projection 16 therefrom will enter the groove 14 in each of the collars 13 successively as the spindle-turret is indexed, whereby the chuck in each of said spindles may be opened and closed at the proper times by the operation of said lever 15.

Each of the feed-tubes 12 has secured thereto a collar provided with a groove 17. In the present construction each of the fingers 17ª adjacent said groove 17 are beveled for a purpose to be hereafter described. The means for operating said feed-tubes consists of two levers 18 and 19 adjustably connected together, the construction being substantially the same as that shown and described in the patent to Gabriel, No. 786,353, said construction permitting adjustment to provide for different feeds as required. The lever 18 is provided with a pin or projection 20 mounted in a hub 20ª, said pin being arranged to enter the grooves 17 in the collars of the feed-tubes successively as the spindle-turret is indexed so that each feed-tube may at the proper time be operated by said lever. The lever 15 for operating the chucks is acted upon by the cam 21 on the cam-shaft 22, and the lever 19 for operating the feed-tubes is acted upon by the cam 23 on said cam-shaft.

Instead of employing a fixed stop for limiting the forward movement of the rod of stock under the operation of the feed mechanism, a movable stop is employed, and the movement of this movable stop is controlled from the same cam-shaft that operates the feed mechanism. This movable stop 24 is best shown in Fig. 8, where said stop is shown as swung out of its operative position. Said stop 24 is operated from the rock-shaft 25 through a rock-arm 25ª, link 25ᵇ, rock-arm 25ᶜ, and a short rock-shaft 25ᵈ to which said stop 24 is secured. Said rock-shaft 25 carries a rock-arm 26. This rock-arm 26 is provided at its free end with two angularly arranged extensions 27, 27ª, offset with relation to each other, one of said extensions carrying a roller 28, and the other carrying a roller 28ª. Secured to the cam-shaft 22 are two cams 29, 29ª, for actuating the rock-arm 26 and rock-shaft 25, the cam 29 being arranged to engage the roller 28 on the extension 27, and the cam 29ª being arranged to engage the roller 28ª on the extension 27ª. As will be seen, the cam 29 will thus operate to move the stop 24 into position in front of a rod of stock, while the cam 29ª will operate to move said stop back to its normal position. By thus employing two separate cams, one for moving the movable stop in one direction, and the other for moving said stop in the opposite direction, the time during which the stop is caused to remain in position in the path of the rod of stock may be regulated as desired by properly shaping the respective cams. It may thus be insured that the stop shall in all cases be moved into position in line with the rod of stock before the feeding movement of said rod begins, and shall be retained in that position until after the chuck-jaws have closed upon the rod.

For indexing the work-spindle turret said turret is provided with a gear 30 which meshes with an intermediate gear 31, which in turn meshes with a gear 32 on an intermediate shaft 33. Secured to said shaft adjacent the gear 32 is a gear 34 which meshes with a gear 35 on a short intermittently rotating shaft 36, which shaft carries a sliding clutch-member 37 adapted to engage a clutch member 38 formed on the gear 39 secured to a continuously rotating shaft 40. The means for shifting the clutch 37 will be hereafter described, but it will be understood that when the clutch member 37 is shifted into engagement with the clutch member 38 the shaft 36 will be rotated and through the intermediate gearing will rotate the work-spindle turret 3.

The work-spindle turret, after each indexing operation, is locked in position, but as said locking mechanism forms no part of the present invention, it has not been shown in its entirety in the drawings, and will not need to be fully described. It is to be understood, however, that the turret is provided with a series of recesses adapted to be successively engaged by a locking-pin 42. Said locking-pin is acted upon by a spring 43 tending to move said pin in a direction to enter one of the recesses in the work-spindle turret. For withdrawing the locking pin the following means are provided: Mounted on a stationary shaft 44 is a sleeve 45 carrying a rock-arm 46 which engages a slot 47 formed in the locking pin. Said sleeve 45 is also provided with a second rock-arm 48 which is arranged to be acted upon by a cam 49 loosely mounted on a sleeve 50. Formed integral with the cam 49 is a sliding clutch-member 51 adapted to engage a clutch-member 52 formed on the gear 39, the construction being such that the clutch-member 51 and cam 49 slide together in throwing the clutch into and out of engagement. As will be seen, whenever the clutch member 51 is thrown into engagement with the continuously rotating clutch member 52, the rock-arm 46 will be operated by the cam 49 to withdraw the locking pin.

It is desirable that the several operations required for presenting the rods of stock to the operation of the several tools, including both the feeding of the individual rods and the indexing of the turret to present a given rod to successive tools, shall take place successively at the proper times and in the proper order, and in the construction shown this result is secured by having the mechanism for performing one of the necessary operations set in motion the mechanism which performs the next succeeding operation.

The several operations involved consist in first unlocking the work-spindle turret, then indexing said turret and locking the same, then opening the chuck-jaws, then feeding forward the rod of stock, then closing the jaws, and finally drawing back the feed-tube. As this feature of the machine forms no part of the present invention, the same constituting one of the features of invention forming the subject of my pending application Serial No. 329,416, it will not be necessary to describe in detail the several mechanisms for performing the successive operations referred to or the manner in which one mechanism sets in motion the next following mechanism, but it will be sufficient to describe only so much of said mechanism as will make plain the construction and operation of the machine as a whole.

Referring to Figs. 2 and 5, the cam-shaft 53 extending crosswise of the machine is provided with a cam 54 carried by the cam-drum 55 to be hereafter more particularly referred to, which said cam engages and operates a lever 56. This lever 56 is provided with an inclined face 57 which engages a roll mounted on the lever 58 pivotally mounted on a stationary shaft 59. A pin projecting from said lever 58 enters a cam-groove in the sliding clutch member 51 and acts to normally hold said clutch member out of engagement with the clutch member 52. When the cam 54 operates to swing the lever 56 and thereby move the inclined face 57 beneath the roll on the lever 58, said lever 58 is raised and the pin referred to thereby withdrawn from the cam-groove in the sliding clutch member, which clutch member is then thrown into engagement with the clutch member 52 by means of a spring acting thereon, which spring is not shown in the drawings. By the engagement of said clutch members the cam 49 is thrown into operation, thereby serving to operate the rock-arm 46 to withdraw the locking pin 42. Secured to or formed integral with said cam 48 is a cam 61 arranged to act on a lever 62 secured to or formed integral with a sleeve 63 loosely mounted on the shaft 59. Secured to or formed integral with said sleeve 63 is an arm 64 carrying a pin which enters the cam-groove formed in the sliding clutch member 37. With this construction, as will be seen, the operation of the mechanism which serves to unlock the turret serves to operate the cam 61, which in turn serves to release the sliding clutch member 37 and permit the same to be thrown by the action of its spring into engagement with the clutch member 38, thereby causing the short shaft 36 and the connecting gearing to be operated to index the turret. It will be further seen that as the operation of the intermittently rotated constant speed shaft 36 for indexing the turret is thus controlled by the turret-unlocking mechanism, and as the operation of said unlocking mechanism is in turn controlled by the main cam-shaft, the operation of said indexing shaft 36 is primarily controlled by said cam-shaft 91 and is secondarily controlled by said unlocking mechanism.

The lever 58 is a spring-pressed lever, and as soon as the cam 54 has passed by so as to permit such movement, the action of the spring pressing on said lever 58 will, by the bearing of the roll carried by said lever on the inclined face 57, operate to move said inclined face from beneath said roll and permit the pin which projects from the lever 58 to enter the cam-groove in the sliding clutch member 51. As said clutch member revolves, the cam in the groove thereof will operate by engagement with the pin projecting from the lever 58, which constitutes a fixed abutment, to withdraw said clutch member 51 from the clutch member 52 and thus stop the rotation of the cams 49 and 61. It will be understood that said clutch member 51 and the cams 49 and 61 are thrown out when they have made one revolution.

The next operations in sequence are the opening of the chuck-jaws, the feeding forward of the rod of stock, the closing of the chuck-jaws and the drawing back of the feed-tube, all of which operations are effected by cams on the cam-shaft 22. As the mechanisms for performing these several operations do not constitute any feature of the present invention, said mechanisms are not fully shown in the drawings and will not be described in detail, but reference will be made only to such parts of said mechanisms as are shown, and which will be sufficient for an understanding of the construction and operation of this part of the machine.

Loosely mounted on the shaft 44 is a gear 68 which meshes with the gear 39 and is thus continuously rotated. This gear is provided with a clutch member 69. Mounted to slide on the shaft 44 is a fellow clutch member 70 provided with a cam-groove and acted upon by a spring. This clutch-member 70 is provided with a gear 71 which meshes with a gear 71ª secured to the cam-shaft 22. Pivoted to a stud 72 is a lever 73 arranged to underlie the sliding clutch member 70 and provided with a pin (not shown) adapted to enter the cam-groove in the clutch-member 70. Said lever 73 is operated in one direction by a cam (not shown) on the shaft 33 and in the opposite direction by a spring (likewise not shown), which spring tends to move the pin on said lever into the cam-groove on the clutch-member 70. With this construction when the clutch-member 37 is thrown into operation and the shaft 33 thereby operated, the revolution of said shaft 33 will, through the cam thereon above referred to but not shown, cause the lever 73 to be swung downward and so as to withdraw the pin thereon from the cam-groove of the clutch member 70, thereby permitting said clutch member to be thrown by its spring into engagement with the clutch member 69, thus causing the clutch-member 70 to be rotated and causing a corresponding rotation of the cam-shaft 22. Thus the throwing into operation of the clutch-member 37 for the purpose of indexing the turret in turn throws into operation the clutch-member 70 for the next succeeding operations, viz., the opening of the chuck-jaws, which is effected by the cam 21, and the operation of the feed mechanism, which is effected by the cam 23, both on the cam-shaft 22. The proper operation of the feed mechanism with respect to the opening of the chuck-jaws is provided for by a proper timing of the cam 23 with relation to the cam 21.

It is preferred to provide the gears 34 and 35 with devices for slowly and easily starting and stopping the turret in its indexing movement, and such devices are shown in Fig. 4 comprising a cam-lever 80 secured to the gear 34 and adapted to engage pins 81 on the gear 35, a portion of the teeth of the gear 35 being removed to permit the operation of said cam-lever and pins in the manner described in the patent to Gabriel, No. 786,353.

Referring now to the arrangement and means for operating the several tools which are to operate upon the rods of stock, instead of mounting all of said tools in a single carrier, three separate carriers are provided, viz., the tool-carrier 82, the die-spindle carrier 92, and a third carrier 82ª, which in the construction shown is arranged to carry a single tool, such for example as a pointing tool. The tool-carrier 82 is mounted to slide on ways 83 formed on the bed-plate 83ª. This carrier 82 is provided with two tool-sockets 84 which are in line with two of the work-spindles 5, viz., the two work-spindles at the left of the spindle-turret axis, as shown in Fig. 8. The mechanism for advancing and retracting the tool-carrier 82 is as follows: The tool-carrier is provided with a rack 85 arranged to be engaged by a gear-segment 86 formed on the end of a lever 87 pivoted on a stud 88. The lower end of the lever 87 is provided with a roll 87ª arranged to be acted upon by cams 89 on the cam-drum 87ª arranged to be acted upon by cams 89 on the cam-drum 90 secured to the cam-shaft 91. The tool-carrier 82 may be provided with any suitable tools for the performance of the work in hand, and ordinarily will be provided with two turning tools, one for taking a roughing cut and the other for taking a finishing cut.

The carrier 92 is especially designed for carrying dies for cutting screw-threads, and this carrier is in the form of a rotary turret provided with any desired number of die-spindles 93, two such die-spindles being shown in the drawings. The turret 92 is mounted for rotation in a concave recess formed in the bed-plate 83ª, the cap 94 being secured to the plate above the turret to form a housing for the same.

In the construction shown the die-spindles 93 are mounted to be moved longitudinally in the turret 92 for the purpose of advancing and retracting the dies carried by said spindles, but if desired, instead of having the die-spindles longitudinally movable in the turret 92, said turret itself may be advanced and retracted for the purpose of advancing and retracting the dies. So also in the construction shown the two die-spindles 93 are connected together, and so that both of said spindles will be advanced and retracted simultaneously, but if desired, instead of having the two die-spindles thus connected, a construction may be employed by means of which the two die-spindles may be advanced and retracted separately instead of simultaneously. The means for thus advancing and retracting the die-spindles are as follows: The turret 92 is provided with a hollow axial projection 95 on which is mounted the sliding collar 96 provided with an annular flange 97, to which flange the ends of the die-spindles are connected in any suitable manner, and so that a longitudinal movement of the collar 96 will be accompanied by a corresponding longitudinal movement of both of the die-spindles. The collar 96 is provided with a groove to receive a fork 98 adjustably secured to a rod 99. This rod 99 is mounted to reciprocate in bearings 100, and is provided with a rack 101 adapted to be engaged by a segment-gear 102 formed on the end of a lever 103 pivoted at 104. The lower end of said lever is provided with a roll 105 adapted to be engaged by the advancing cams 106 and the retracting cams 106ᵈ on the cam-drum 90.

The die-spindle is advanced to bring the die into engagement with the rod to be threaded by means of the cam 106 acting upon the lever 103 through the rod 99 and the connections from said rod to the die-spindle. It is preferred to provide means for positively starting the die on to the work, and then to allow the die to be drawn on to the work solely by its own lead, and the cam 106 is so shaped and the construction is such as to produce these results. Thus the cam 106 is provided with two angular faces 106ª and 106ᵇ preferably of different inclinations. The angular face 106ª serves to advance the die-spindle so as to bring the die in contact with the end of the rod to be threaded and then the incline 106ᵇ, which is comparatively short, serves to positively start the die on to the rod. When the die has thus been started on, the further advancing movement of the die will be controlled solely by the lead of the die itself, and the cam 106 will have no further effect thereon, the roll on the lower end of the lever 103 having at this time passed away from said cam, the die being, with the construction shown, what is termed a "floating die", that is, the die, together with its spindle being free to move lengthwise under the action of the lead of the die on the rod which is being threaded.

By making the fork 98 adjustable on the rod 99 the threading of screws of different lengths may be provided for without changing the cam 106. Thus to whatever extent the rod may project from its chuck, the distance between the position of the die before it begins to advance and the end of the rod may be made always the same by simply adjusting the fork 98 along the rod 99, so as to bring the die at the required distance from the end of the rod, this distance being the distance which the die will be advanced by the incline 106ª on the cam 106.

The means for indexing the die-spindle turret are as follows: The turret is provided with a gear 107 which is engaged by a gear 108 secured to an intermittently rotating shaft 109. The shaft 109 is connected by bevel-gears 110 with a shaft 111, which shaft is connected by bevel-gears 112 with a shaft 113 on which is mounted a sliding clutch-member 114 adapted to engage a clutch-member 115 formed on the gear 116, which is loosely mounted on the shaft 113. The gear 116 meshes with a gear 117 mounted on the shaft 40. Said shaft 40 is continuously rotated by mechanism to be hereafter described.

The means for controlling the operation of the sliding clutch member 114, and thus controlling the indexing of the die-spindle turret, constitutes one of the features of the present invention and will be hereafter described.

It will be understood that suitable means are employed for locking and unlocking the die-spindle turret, such, for example, as the mechanism shown and described in my pending application referred to, but as such means form no part of the present invention, the same has not been fully shown in the drawings and need not be described.

Before describing the means for rotating the die-spindle it will be convenient to describe the general organization of the machine with respect to the several operating mechanisms and the several trains of mechanism for operating the different parts of the machine.

The present machine is provided with a single driving pulley and driving shaft, which single driving shaft has a constant speed, and from which single shaft power is taken for operating all of the several mechanisms which go to make up the complete machine. From said single constant speed driving shaft lead three separate trains of mechanism, one to the work-spindles, another to the cam-shaft, and a third to the die-spindles. These several separate trains of mechanism will now be described.

Referring to Figs. 1, 2, 5, and 6, 118 is the driving pulley which, as shown, is a single faced pulley. In the particular construction shown the constant speed driving shaft is in the form of a hollow sleeve 119 to which the pulley 118 is secured, and which sleeve is mounted in a bearing 120 in the frame of the machine. Passing through said sleeve 119 is a shaft 121, which in the construction shown rotates with the sleeve or driving shaft 119. Loosely mounted on said shaft 121 are three gears, viz., gear 122, gear 123, and a double gear or quill-gear 124, 125, said quill-gear being mounted in a bearing 126, and the gear 123 being mounted on and secured to the hub of said quill-gear. The gear 122 forms a part of the train of gearing leading to the work-spindles, the gear 123, being a sprocket-gear, forms a part of the train of gearing leading to the cam-shaft; and the quill gear 124, 125, forms a part of the train of gearing leading to the die-spindles. The gear 122 is provided on each side with clutch-teeth, the clutch-teeth on one side engaging corresponding clutch-teeth upon the inner end of the sleeve or driving shaft 119, and the clutch-teeth upon the opposite side of said gear engaging corresponding clutch-teeth on the adjacent face of the hub of the quill-gear 124, 125, as indicated by dotted lines in Fig. 6. By this construction the gear 122 is rotated by its clutch engagement with the sleeve or driving shaft 119, and the gear 123 and quill-gear 124, 125 are rotated by the clutch engagement of the gear 122 with the hub of said quill-gear. The gear 122 engages the gear 10 on the shaft 8, which extends axially through the work-spindle turret. The purpose of the clutch construction above described is to permit the removal of the gear 122 and the substitution of a gear of a different size in its place, the gear 10 being also removable from its shaft, and so that said gears 122 and 10 thus constitute a pair of change gears, by the changing of which the speed of the work-spindles may be changed.

In the construction shown the removal of the gear 122 and the substitution of another gear therefor is effected as follows: The shaft 121, as shown in Fig. 6, is connected with the quill-gear 124, 125, by being screwed into the end of the hub of said quill-gear, the outer end of said shaft being provided with a squared head for the application of a wrench. By unscrewing the shaft 121 from the hub of the quill-gear said shaft may be withdrawn to a sufficient extent to permit the removal of the gear 122, which said gear is supported solely by said shaft. In the drawings a lock-nut 127 is shown, which of course is to be removed when the shaft 121 is to be thus partially withdrawn.

It will be understood that the detail construction above described is not essential, but merely constitutes one construction for providing change gears in the work-spindle train, and it will be further understood that any other suitable construction may be employed in place thereof. It will also be understood that, in case it should not be desired to have change gears in the work-spindle train, the sleeve 119 may be omitted and the driving pulley 118, as well as the several gears referred to, may be secured directly to the shaft 121.

The train of gearing leading from the constant speed driving shaft 119 to the cam-shaft 91 will next be described. The sprocket-gear 123 is connected by a chain 128 with a sprocket-gear 129 secured to a sleeve 130 mounted to revolve on a fixed stud. Secured to the sleeve 130 is a gear 131 which meshes with a gear 132 secured to a shaft 133 (Fig. 5). Said gear 132 is provided with a clutch-face. Loosely mounted on the shaft 133 is a double gear or quill-gear 134, 135, the gear 134 being provided with a clutch-face adapted to engage the clutch-face on the gear 132. The gear 135 engages a gear 136 secured to the shaft 40 hereinbefore referred to and through which gears said shaft 40 is continuously driven. The quill-gear 134, 135 is provided with a flanged groove 137 adapted to be engaged by a fork 138 secured to a sliding rod 139. Said sliding rod is engaged by a rock-arm 140 carried by the shaft 141, which said shaft extends across the machine and is provided at its front end with a hand lever 142 by means of which the quill-gear 134, 135 may be shifted by hand.

It will be understood that by shifting the quill-gear to unclutch the gear 134 from the gear 132 the continuously rotating shaft 40 and the cam-shaft 91 will be disconnected from the constant speed driving shaft, and that thus all the parts of the machine, except the work-spindles and the die-spindles, will be stopped.

It is desirable that the cam-shaft 91 shall be operated at two different speeds, and that the change from one speed to the other shall be automatically effected. In the present construction means are also provided for changing the speed of said cam-shaft 91 by hand by means of change gears. The means provided for thus automatically changing the speed of said cam-shaft 91 will now be described. Secured to said shaft is a worm-wheel 143 which engages a worm 144 on the shaft 145. Secured to said shaft 145 is a bevel-gear 146 which meshes with a bevel-gear 147 on the shaft 148. Secured to said shaft 148 adjacent to the bevel-gear 147 is a spur-gear 149 which meshes with a spur-gear 150 loosely mounted on the shaft 151. The gear 150 is provided on one side with a clutch-member 152 adapted to engage the clutch member 153 secured to said shaft 151, and said gear is provided on its opposite side with a clutch-member 154 adapted to engage a clutch-member 155 secured to a gear 156 loosely mounted on said shaft 151. Said gear 156 meshes with the gear 134 of the quill-gear above referred to, whereby a constant fast speed is given to the clutch member 155. The clutch-member 153, as above stated, is fast on the shaft 151, to which shaft is secured a gear 157. Said gear 157 meshes with a gear 158 secured to a sleeve mounted on an intermediate stud 159. Secured to the same sleeve is another gear 160 which meshes with a gear 161 on the shaft 40. The gearing through which the shaft 151 is connected to the quill-gear 134, 135 is such as to give a relatively slow speed to the clutch member 153, and as the gears 157, 158, 160, and 161 are all change gears, the slow speed of said clutch member 153 may, by changing said gears, be varied at will. As will be seen, therefore, a constant fast speed is given to the clutch-member 155, and consequently the cam-shaft 91 will be rotated at a fast speed or at the varying slow speed, according as the gear 150 and the clutches carried thereby are shifted in one direction or the other.

For shifting the gear 150 and its clutch members a rock-shaft 162 is mounted in suitable bearings, which rock-shaft extends crosswise of the machine, as shown in Fig. 3, and carries at one end the fork 163 which engages a suitable groove in the hub of the gear 150 and is provided at the other end with a rock-arm 164. A link 165 connects the rock-arm 164 with an arm 166 loosely pivoted on a stud 167. Loosely pivoted on said stud 167 is a double armed lever 168, one arm 169 of which carries the roll 170 arranged to be acted upon by the wedge-shaped head 171 of a spring-pressed plunger 172. The arm 169 of the lever 168 is connected with the pivoted arm 166 by a connection in which a certain amount of lost motion is provided. The other arm 173 of the lever 168 carries a tubular support 174 in which is mounted a spring-pressed rod, which is provided at one end with a knob 175 and at the other end with a roll 176 arranged to be engaged by cams 177 on the cam-wheel 178 secured to the shaft 91. The spring of the spring-pressed rod referred to acts to keep the roll 176 normally in the path of the cams 177, but by pulling said rod outward the roll may be withdrawn out of the path of said cam. With this construction, as will be seen, the gear 150 and the clutches carried thereby will be shifted at the proper time, first in one direction and then in the other, by the action of the spring-pressed plunger 172 when the proper cam 177 has moved the roll 170 past the apex of the wedge-shaped head 171 of said plunger in one direction or the other, thereby giving to the shaft 91 a fast and a slow speed alternately.

It will be understood that the construction is such that the shaft 91 is revolved at the slow speed during the time it is operating to advance the several tool-carriers to be hereafter referred to, and is revolved at the fast speed during the time it is operating to retract said tool-carriers.

Suitable means are employed for moving the gear 150 and the clutches carried thereby out of engagement with both of the fellow clutch members and for locking the same out of engagement, but as such means form no part of the present invention, they have not been fully shown in the drawings and need not be described.

The train of gearing leading from the constant speed driving shaft 119 to the die-spindles for rotating said die-spindles will next be described. In the construction shown means are provided for rotating the die-spindles at two different speeds in the same direction and for rotating said die-spindles at a third speed in the opposite direction, and means are also provided for holding the die-spindles against rotation.

Referring to Figs. 6 and 7, the train of mechanism for rotating the die-spindles leads off from the quill-gear 124, 125, which is directly rotated by the constant speed driving shaft 119, as above described. In the operation of the machine herein shown the die-spindles are rotated both during the threading and unthreading operations and in the same direction, and are so rotated in the same direction that the work rotates, said die-spindles being rotated at a slower speed than the work for threading, and being rotated at a faster speed than the work for unthreading. It will be understood, however, that by properly changing the gearing other methods of threading may be employed.

Engaging with the gear 124 of the quill gear is a gear 179 loosely mounted on a stationary shaft 180 which in the construction shown is in the form of a sleeve secured to a second stationary shaft 181. Engaging with the gear 125 of said quill gear is a gear 182 likewise loosely mounted on the stationary sleeve or shaft 180. Each of the gears 179 and 182 is provided with a clutch face, as shown, and loosely mounted on said sleeve or shaft 180 intermediate said gears is a sliding clutch member 183 provided with clutch faces adapted to engage the clutch faces on the gears 179 and 182, respectively. Secured to or formed integral with said sliding clutch member is a gear 184 which engages a gear 185 secured to a shaft 186 mounted in suitable bearings. Secured to said shaft 186 is a gear 187 which meshes with a gear 188 on the shaft 189 which extends axially of the die-spindle turret. Said shaft 189 is provided with an elongated gear 190. Each of the die-spindles 93 is provided with a gear 191, which gears engage the elongated gear 190 on the shaft 189.

With the construction above described it will be seen that the die-spindles are rotated direct from the constant speed driving shaft 119. By making the gears 124 and 125 of different sizes and the gears 179 and 182 of correspondingly different sizes, it will be seen that when the clutch member 183 is in engagement with the gear 182 the die-spindles will be rotated at one speed, and when said clutch member is in engagement with the gear 179 the die-spindles will be rotated at another speed. In the construction shown, when said clutch member is in engagement with the gear 182, the die-spindles will be rotated at a slower speed than the work-spindles for threading, and when said clutch member is in engagement with the gear 179 the die-spindles will be rotated at a faster speed than the work-spindles for unthreading.

As the driving shaft 119 is a constant speed driving shaft, it is desirable to provide means for changing the speed of the work-spindles, and in the construction shown such means has been provided by the change gears 122 and 10, as hereinbefore explained. When the speed of the work-spindles is changed by changing the change gears referred to, it is desirable to correspondingly change the speed of the die-spindles, and for this purpose the gears 187 and 188 in the die-spindle train are change gears, as shown in Fig. 6, by the changing of which gears the speed of the die-spindles may be maintained in proper ratio to the speed of the work-spindles for threading and unthreading.

It will be further seen that with the construction shown changes in the speed of the die-spindles by the change-gears referred to to correspond with changes of speed of the work-spindles are effected without changing the speed of the sliding clutch member 183, which is therefore likewise rotated at its normal slow and fast speeds, respectively, and the speed of which is consequently always kept within suitable limits to permit the ready engagement of the clutch faces when said clutch member is shifted.

It is sometimes desirable to rotate the die-spindles in the reverse direction, either at the same or at a different speed, and for this purpose an intermediate gear 192 is provided which engages the gear 187, said gear 192 being mounted in a swinging arm 193 arranged to swing about the shaft 186 so that said gear 192 may be thrown into or out of engagement with the gear 188ª which in this case is substituted for the gear 188, as shown in Fig. 7.

As heretofore explained, in the construction shown the die-spindle is rotated at its slow speed in cutting the thread and is rotated at its higher speed in running off the die. It will be understood, therefore, that the shifting of the clutch member 183 to change the speed of the die from a low to a high speed is to be made when the cutting of the thread has been completed, and it will be further understood, therefore, that the length of the thread will be determined by the time of the shifting of said clutch member in the direction to change from the low speed to the high speed. The mechanism for shifting said clutch member 183 is of such character that the shifting of said clutch member to change from the low speed to the high speed is effected or controlled, not by an independently operated cam, but by the lengthwise movement of the die-spindle itself, and with such mechanism, therefore, the length of the thread may be accurately determined and uniformly maintained, because the lengthwise movement of the die in cutting the thread controls the change of speed of the die to effect the running off thereof.

Referring to Figs. 1, 2, 3, 10, and 11, the hub of the clutch member 183 is provided with a groove to receive a shifter-fork 194 carried by the sliding rod 195, which rod is provided with a sleeve 196 secured thereto, said sleeve having shoulders 197, 198. A shifting lever 199 carried by a rock-shaft 200 has its upper end arranged to lie between the shoulders 197, 198. Said rock-shaft 200 extends across the machine, as shown in Fig. 3, and secured to the opposite end of said rock-shaft is an arm or lever 201 carrying at its lower end a roll (not shown but corresponding to the roll 176) arranged to be acted upon by cams 202 on the cam-wheel 203 carried by the shaft 91. Arranged below the lower end of said lever 201 is a spring-pressed plunger 204 provided with a wedge-shaped head 205 adapted to engage the roll 206 carried by the lower end of said lever. With this construction the actual shifting of the clutch member 183 is effected in both directions, not by the cams 202, but by the spring-pressed plunger 204, and the primary purpose of such spring-pressed plunger is to shift said clutch member more quickly than could be done by the cams. With the present construction the employment of the spring-pressed plunger serves a further and important purpose in enabling the shifting of said clutch member to be controlled by the lengthwise movement of the die-spindle, for the reason that when such spring-pressed plunger is employed for shifting the clutch, said plunger may be moved by the cam to a position to put its spring under tension, but not sufficiently far to shift the clutch, and may then be latched in this position so that the actual shifting of the clutch will be controlled by the unlatching of said plunger, which unlatching may in turn be controlled by the lengthwise movement of the die-spindle, whereby the change of speed of the die-spindle will be effected or controlled, and the length of the thread will be thus determined, by the lengthwise movement of the die itself in cutting the thread. Inasmuch as this control of the shifting of the clutch by the lengthwise movement of the die-spindle is important only in changing the speed of the die-spindle from the low speed to the high speed to stop the cutting of the thread and to effect the running off of the die, the latching of the spring pressed plunger in the manner referred to need only take place in connection with the shifting of the clutch to change from the low speed to the high speed, and the shifting of the clutch in the opposite direction to change from the high speed to the low speed may be effected by the spring pressed plunger immediately after the roll on the lever 201 has passed the apex of the wedge-shaped head of said spring-pressed plunger.

The mechanism for latching the spring-pressed plunger in the manner above referred to and for controlling the shifting of the clutch in changing from the low speed to the high speed is as follows: The sleeve 196 secured to the sliding carriage 195 is provided with an annular flange 207 adapted to be engaged by the notched arm 208 of a pivoted bell-crank lever, the other arm 209 of which lever extends upwardly as shown in Fig. 11. Adjustably secured on the rod 99 is a block 210 having a projecting arm 211 arranged in line with the upper end of the arm 209 on the bell-crank lever referred to. A spring 212 acts to keep the notched arm or latch 208 in engagement with the flange or collar 207. With this construction the operation is as follows:

Assuming the parts to be in the position shown in Figs. 10 and 11, and which is the position which the parts occupy just before the cutting of the thread has been completed and after the cam 202 has acted to shift the lever 201, it will be seen that the lever has been shifted by the cam only far enough to carry the roll 206 just past the apex of the wedge-shaped head 205 of the spring-pressed plunger. As will be seen, with the parts in the position shown, the spring-pressed plunger is prevented from shifting the lever any farther by reason of the engagement of the collar 207 with the latch 208, which latch so long as it remains in engagement with said collar serves to prevent any further movement of the sliding rod 195. As now the die-spindle continues to advance in cutting the thread, the projection 211 on the block 210 carried by the rod 99 (which rod is connected to and moves with the die-spindle in its lengthwise movement) will be brought into engagement with the upper end of the arm 209, and as the die-spindle and rod 99 continue to advance said projection 211 will act to swing the arm 209 to the right in Fig. 11, thereby turning the bell-crank lever and moving the arm or latch 208 out of engagement with the collar 207, thereby releasing the sliding rod 195 and permitting the spring-pressed plunger to operate to move said rod so as to shift the clutch 183 and thus change the speed of the die-spindle from the slow speed to the fast speed, which will result in stopping the cutting of the thread and cause the running off of the die to begin.

It will be noted that as the latch 208 is in engagement with the collar 207 during the cutting of the thread the clutch 183 will be positively held in engagement with the clutch-face on the gear 182 during such operation. It is desirable that during the running off of the die the clutch 183 should likewise be held positively in engagement with the clutch face on the gear 179, and means are provided for that purpose.

Pivoted to the frame is a latch-lever 213 adapted to engage a shoulder on the sleeve 196, when the rod 195 has been shifted in the direction to engage the clutch 183 with the gear 179. As will be seen, the rod 195 will be held in that position and the clutch members will be held in engagement as long as said latch 213 remains in engagement with the shoulder referred to. For the purpose of disengaging said latch 213 the lever 199 is provided with a pin 214 arranged to underlie the cam surface on said latch lever. When the lever 199 therefore is shifted in the opposite direction, the engagement of the pin 214 with said cam surface will serve to unlatch said latch-lever 213 to permit the shifting of the sliding rod 195. It will be noted that the distance between the shoulders 197 and 198 is such as to provide a certain amount of lost motion for the lever 199 to permit the said lever to be operated by the cams 202.

In order to guard against the contingency that the spring-pressed plunger 204 may for any reason fail to act to shift the clutch 183 when permitted to do so, additional means are provided for positively shifting said clutch. The adjustable block 210 is provided with a projection 215 arranged in line with the upper end of a lever 216 pivoted to the frame, the opposite end of said lever being arranged to lie in the path of the collar 207 on the sliding rod 195, as shown in dotted lines in Fig. 11. These parts are so arranged that if the sliding rod 195 is not shifted by the spring-pressed plunger the projection or arm 215 will by the advancing movement of the rod 99 be brought into engagement with the upper end of the lever 216, and the continued movement of said rod 99 will in such case, through the engagement of said lever 216 with the collar 207, positively shift the rod 195 and the clutch 183 operated thereby.

It will be noted that by adjusting the position of the block 210 on the rod 99 the time when the rod 195 is permitted to be shifted by the action of the spring-pressed plunger in changing from the slow speed to the fast speed may be varied with respect to the lengthwise position of the die-spindle, or in other words, that the shifting of said lever may be caused to take place at varying positions in the advance of the die-spindle, and so that different lengths of thread may be thereby provided for.

While in the construction shown and with the method of threading employed the advancing movement of the die serves to determine the length of the thread to be cut by controlling the shifting of a clutch which changes the rotation of the die-spindle from one speed to another, this feature of having the length of the thread to be cut determined by the advancing movement of the die may be employed in connection with other methods of threading, as for instance, where the running off of the die is effected by reversing the direction of rotation of either the work-spindle or the die, in which case the advancing movement of the die may serve to control the shifting of a clutch to effect such reversal in the direction of rotation.

In the present machine the indexing of the die-spindle turret is controlled, not by a cam on the cam-drum, but instead by the retracting movement of the die-spindle. The mechanism for thus controlling the indexing of the die-spindle turret will next be described. The indexing of the die-spindle turret is effected by the engagement of the sliding clutch-member 114 with the clutch member 115 formed on the gear 116. The means for controlling the engagement of said clutch is as follows: Pivoted on the frame is a lever 217. Connected to one end of this lever is a connecting rod which, for a purpose to be hereafter described, comprises two parts, 218, 219, these two parts being yieldingly connected together. The lower end of said connecting rod is pivotally connected to a lever 220 which carries the pin 221, which controls the release of the spring-actuated indexing clutch 114. The free end of the lever 217 is provided with a cam surface 222 adapted to be engaged by a corresponding cam surface 223 on a pivoted dog 224 pivoted to an extension 225 of the rack 101 carried by the rod 99. The pivoted dog 224 is free to turn to the left in Fig. 11, but is prevented from turning to the right by a lip or projection 226 on the extension 225, as shown in Fig. 11. As it may be desired at times, as for instance if it is desired that the die-spindle turret shall not be indexed, to turn the pivoted dog 224 to a position where it will not engage the lever 217, said dog is provided with a lip 227 adapted when the dog is turned up to engage a spring-latch 228 mounted in the extension 225.

The operation of the parts above described is as follows: Referring to Figs. 2 and 11, it will be understood that the die-spindles are in their retracted position, and it will be seen that the cam surface 223 on the pivoted dog 224 has passed by the cam surface 222 on the lever 217. When now the die-spindles are advanced the projection on the pivoted dog will engage the projection on the lever 217, but as said dog is free to turn to the left, the dog will be so turned as the die-spindles advance and will thus pass by the projection on the lever. When the dog is so passed by it will fall by gravity to its normal position, and so that the cam surface 223 will be brought in line with the cam surface 222. When now the die-spindles are retracted, as said die-spindles approach the point of their farthest retraction, the cam surface 223 will engage the cam surface 222, and as the pivoted dog is prevented from turning to the right, the engagement of said cam surfaces as the retracting movement of the die-spindle continues will serve to depress the free end of the lever 217 and raise the opposite end of the lever and thereby through the connecting rod 218, 219, will serve to withdraw the pin 221 from engagement with the clutch-member 114, thereby releasing said clutch member and permitting the same to be thrown by the action of its spring into engagement with the clutch member 155, and thereby start the indexing of the die-spindle turret. As will be understood, the time when said indexing clutch will be thus released by the retracting movement of the die-spindles will be governed or regulated with relation to the rearward movement of said die-spindles by changing the location of the pivoted dog 224 with relation to the end of the lever 217.

One object of controlling the indexing of the die-spindle turret by the retracting movement of the die-spindles is to insure that said turret shall not be indexed when the die-spindles are in their advanced position. If, however, no means were provided to prevent it, the lever 217 might be operated by hand at a time when the die-spindles were in their advanced position. Means, however, are provided to prevent said lever from being thus operated by hand at such time. For this purpose the free end of the lever 217 is provided with a pin 229 projecting laterally therefrom, and on the lever 103 is secured a block 230. The arrangement of said pin 229 and block 230 is such that when the die-spindles are in their advanced position said block will underlie said pin and thus prevent the downward movement of the free end of the lever 217, the parts thus constituting a lock for locking said lever against movement so long as the block 230 remains beneath the pin 229.

It is possible that the machine may be stopped at a time when the locking pin 221 of the indexing clutch is withdrawn, at which time said pin rides on the flange of the clutch member 114. If with the parts in this position the operator should start to turn the main cam-shaft by hand, which would result in turning the lever 103, the end of the block 230 would strike against the pin 229, and if the end of said block were square, this would be likely to result in damaging some of the parts. To guard against this, the upper right hand end of the block 230 is beveled at 231, as shown by dotted lines in Fig. 11. With this construction, as will be seen, this beveled surface will strike the pin 229 and by reason of its bevel will operate by its engagement with said pin to raise the free end of the lever 217. This movement of said lever 217 is permitted by reason of the yielding action between the two parts 218 and 219 of the connecting rod which connects said lever with the lever 220. The construction of said connecting rod is as follows: The part 218 is arranged to slide in a guide 232, as shown in Figs. 2 and 7, the connection between the parts 218 and 219 being provided with a certain amount of lost motion. As more fully shown in Fig. 12, the part 218 is slotted at its lower end to receive the end of the part 219 and so as to form two ears 233 through which the pivot-pin 235 passes. Each of these ears is provided with an elongated slot 235. In said part 218 is bored a hole to receive a spring-pressed plunger acted upon by a spring 237, the lower end of which plunger bears against the upper end of the part 219 and thus serves to firmly keep the pivot-pin 235 at the lower ends of the slots 235. If, however, the lever 103 should be moved so as to cause the bevel surface 231 on the block 230 to engage the pin 229, the spring 237 will yield and thus permit the part 218 to move downward and likewise permit the free end of the lever 217 to move upward, thereby preventing injury to any of the parts.

The next feature of invention to be described relates to means whereby the feed lever will be automatically connected with each feed-tube in turn irrespective of the position which the feed-tube may occupy. The means whereby this is accomplished is as follows: As heretofore pointed out, each of the flanges 17ª on the collar of the feed-tube is beveled on its outer side. As shown in Fig. 9, the pin 20 is a spring-pressed pin, being acted upon by a spring 238 which abuts at one end against the shoulder on said pin and at the other end against a collar 239, and so that said pin is thus capable of yielding. Preferably the inner end of the pin is provided with a friction roller 240. With this construction, as will be seen, if any one of the feed tubes should happen to be out of position lengthwise, and so that the groove 17 was out of alinement with the pin 20, said feed tube will nevertheless be automatically picked up or engaged by the feed-lever 18. Thus as the feed-lever is operated the spring-pressed pin 20 will come in contact with one or the other of the bevel flanges 17ª, and by reason of the bevel of said flange will be depressed until the feed-lever has moved to a position to bring said pin in line with the groove 17, when said pin will be immediately, by the action of its spring, projected into said groove and the feed-tube thereby connected with the feed-lever.

Adjustably secured on a rod or bar 241 projecting from the frame is an annular guide 242 located at the rear of the feed-tube, as shown in Figs. 1 and 4. Said annular guide 242 not only serves as a guard to protect the rear ends of the feed-tubes, but is also preferably so adjusted in position as to serve as a guide to limit the rearward movement of the feed-tubes by hand, and so that said feed-tubes may not be moved so far to the rear that they will not be automatically engaged by the feed-lever in the manner above described. Moreover if the pin 20 of the feed-lever at any time happens to be in advance of the collar on the feed-tube, when said pin in the rearward movement of the feed-lever comes in contact with the forward bevel-flanges 17ª on the feed-tube, said annular guide 242 will serve as an abutment to prevent the rearward movement of the feed-tube by the engagement of the pin 20 with said flange and so as to cause said pin to ride up the bevel of the flange and thus be brought in line with the groove 17. It may be stated, however, that the presence of the annular guide referred to is not necessary in order to enable the feed tube to be automatically engaged by the feed-lever, but that the resistance to the inward movement of the pin 20 is so much less than the resistance to the lengthwise movement of the feed-tube that said pin will be readily forced inward by the bevel-flange without imparting any lengthwise movement to the feed-tube.

Several important advantages result from the construction above described whereby the feed-lever may be automatically connected with each feed-tube in turn, whatever the position of such feed-tube may be. Heretofore it has been customary in these multiple spindle machines to employ an annular guide surrounding the feed-tubes and arranged to enter the grooves in the collars on said feed-tubes, there being a break in this annular guide at the point at which the feed-tube which is to be advanced by the feed-lever is located, the purpose of such guide being to maintain the feed-tubes in proper position with relation to the feed-lever and so that each tube will be sure to be engaged by said lever as the turret is indexed. When new rods of stock are to be inserted it is desirable that the feed-tubes shall be advanced until their flanges come in contact with the rear ends of the spindles and so that the force of the blows when the rods are hammered to force them between the spring-fingers of the feed-tubes will be taken by the comparatively solid spindles. With the former construction it was necessary to index the work-spindle turret one-eighth of a turn in order to enable the feed-tubes to be thus advanced, the annular guide being provided with recesses to permit the passage of the collars on the feed-tubes. When the new rods had been inserted it was then necessary to move the feed-tubes back again by hand to bring the grooves in the collars of the feed-tubes in line with the annular guide and to then again index the work-turret one-eighth of a turn to bring the work-spindles to proper position and to cause the feed-collars to be engaged by the annular guide.

With the present construction all of the above manipulations are done away with. When new rods of stock are to be inserted the feed-tubes, which are entirely free to be moved in either direction, are simply advanced to bring their flanges into contact with the rear ends of the spindles and left there. No preliminary indexing of the turret is necessary and there is therefore no need of any return indexing thereof. Moreover the feed-tubes do not require to be moved back by hand, but may be left in their advanced position where they will be each in turn automatically engaged by the feed-lever and operated thereby.

A characteristic feature of the feed mechanism employed for feeding forward the rods of stock and which, as above stated, forms the subject of the Letters Patent to Gabriel, No. 786,353, is that the stopping point of the feed-lever in its forward movement is always the same, and that the extent of feed is varied or adjusted by varying or adjusting the starting point of said feed-lever. With such construction the feed-tube is fed forward so as to bring the collar thereon close up to the rear end of the spindle. With this construction, therefore, the forward movement of the feed-lever is always such that even if the feed-tubes are in their extreme forward position they will nevertheless be automatically engaged by the feed-lever in its forward movement.

With the former construction whenever the extent of the feed was to be varied it was not only necessary to correspondingly adjust the lengthwise position of the annular guide, but it was also necessary to move the feed-tubes a corresponding distance in order to keep the grooves in the feed-collars in alinement with the annular guide. With the present construction, however, when the extent of feed is to be adjusted, there is no need to adjust the position of the feed-tubes, and instead said feed-tubes may be left in their former position, where they will be each in turn automatically engaged by the feed-lever and will thereafter be moved and operated by said lever in accordance with the new adjustment of the feed.

When the annular guide or guard 242 is employed in the present construction, if it be desired to have said guide always located in close proximity to the extreme rearward position of the feed-tubes, then whenever the extent of feed is adjusted the position of such guide should be correspondingly adjusted. It is not necessary, however, that said annular guide or guard should be thus always maintained in close proximity to the extreme rearward position of the feed-tubes, as the same may perform the function of a guard for the rear ends of the feed-tubes without being so located, and in such case the feed may be varied more or less without any necessity for adjusting said annular guard, and in such case there will be nothing to be adjusted but simply the feed mechanism itself. Thus by the present construction, so far as the matter of adjusting the feed is concerned, the multiple spindle machine is made practically as simple and as easy to be adjusted as the single spindle machine.

In the present machine three cross-slides are provided, each of said cross-slides being arranged to operate upon a rod of stock in a different indexed position.

Referring to Figs. 2 and 8, 243 represents one of the cross-slides carrying a tool 244 which may be a rough-forming tool. This cross-slide, which is a horizontal slide, is operated in the usual manner directly by the cams 245 engaging a roll 246 on the cross-slide. Arranged at the opposite side of the machine is a corresponding horizontal cross-slide 247 provided with a tool 248 which may be a cutting-off tool, and this cross-slide is also directly operated by a cam 249 engaging a roll 250 on the cross-slide. The third cross-slide 251 is a vertical cross-slide carrying a tool 252 which may be a finishing forming tool and which as shown is arranged to operate upon the rod of stock in a different indexed position from either of the tools in the other two cross-slides. The cross-slide 251 is located above the cross-slide 247, and means are provided whereby said cross-slide 251 may nevertheless be operated in a vertical direction by the same cam-drum which operates the cross-slide 247 in a horizontal direction. The means for thus operating the cross-slide 251 in a vertical direction is as follows: Pivoted to the frame at 253 is a lever 254, the lower end of which carries a roll 255 adapted to be engaged by a cam 256 which is on the same cam-drum 55 on which the cam 249 is located. The upper end of the lever 254 is provided with a segment-gear 257 which engages a gear 258 mounted on a stud 259. The gear 258 meshes with one of the gears 260 of the quill-gear 260, 261, the other gear 261 of said quill-gear engaging a rack 262 adjustably secured to the cross-slide 251. For the purpose of adjusting the rack 262 with relation to the cross-slide said rack is provided with a screw 263 and an adjusting nut 264. With this construction, as will be seen, both the horizontal cross-slide 247 and the vertical cross-slide 251 are operated from one and the same cam-drum, and it will be further seen that by the construction above described the mechanism for operating the vertical cross-slide 251 is off-set with relation to said cross-slide, and so that said vertical cross-slide may thus be arranged directly above the horizontal cross-slide 247, while at the same time the gear construction provides a rigid and powerful mechanism for operating said vertical cross-slide.

It will be understood that certain features of the invention are adapted for use, not only in a multiple spindle machine, that is, a machine having a series of work spindles but also in a machine having only a single work-spindle.

It will be further understood that while in the preferred construction shown two die-spindles are employed, one for partially cutting the thread and the other for completing the thread, certain features of the invention are adapted for use in a machine having only one die-spindle and in connection with such single die-spindle.

It will be further understood that, instead of the die-spindles being longitudinally movable in the die-spindle turret, said die-spindle turret may instead have a longitudinal movement imparted thereto, the die-spindle in such case moving longitudinally with the turret.

With respect to the operation of the movable stop for limiting the feeding movement of the rod of stock, while I have shown two separate cams, one for moving said stop into the path of said rod and the other for moving said stop out of the path of said rod, it will be understood that if desired these two cams may be made in one piece, and also that such one-piece cam may, if desired, be provided with a cam-slot having two cam surfaces, the important thing in this connection being merely that there shall be two cam surfaces so constructed and so related to each other as to impart relatively quick movements to the movable stop in one direction or the other, and to provide for a relatively long dwell between the action of the cam which moves the stop into the path of the rod and the action of the cam which moves the stop out of the path of said rod.

As will be understood, the construction of the several parts of the machine may be widely varied without departing from the main characteristic feature of the invention.

What I claim as my invention and desire to secure by Letters Patent is:

1. The combination of a driving member, a work-spindle, a connection from said driving member to said work-spindle, speed changing means in said work-spindle connection, a die-spindle, a connection from said driving member to said die-spindle, and means for correspondingly changing the speed of said die-spindle.

2. The combination of a driving member, a work-spindle, a connection from said driving member to said work-spindle, hand operated speed changing means in said work-spindle connection, a die-spindle, a connection from said driving member to said die-spindle, and hand-operated means for correspondingly changing the speed of said die-spindle.

3. The combination of a driving member, a work-spindle, a connection from said driving member to said work-spindle, hand-operated speed-changing means in said work-spindle connection, a die-spindle, a connection from said driving member to said die-spindle, and means embodying a shifting clutch for changing the speed of said die-spindle, the speed of said shifting clutch being unaffected by changes in the speed of the work-spindle.

4. The combination of a driving member, a work-spindle, a connection from said driving member to said work-spindle, hand-operated speed changing means in said work-spindle connection, a die-spindle, a connection from said driving member to said die-spindle, a shifting clutch in said die-spindle connection, and means for giving to said clutch two different speeds to change the speed of said die-spindle.

5. The combination of a driving member, a work-spindle, a connection from said driving member to said work-spindle, hand-operated speed changing means in said work-spindle connection, a cam-shaft, a connection from said driving member to said cam-shaft, and hand-operated speed-changing means and automatically operated speed-changing means in said cam-shaft connection.

6. The combination of a driving member, a series of work-spindles, a connection from said driving member to said work-spindles, hand-operated speed-changing means in said work-spindle connection, a cam-shaft, a connection from said driving member to said cam-shaft, and hand-operated speed-changing means and automatically operated speed-changing means in said cam-shaft connection.

7. The combination of a driving member, a work-spindle, a connection from said driving member to said work-spindle, hand-operated speed-changing means in said work-spindle connection, a die-spindle, a connection from said driving member to said die-spindle, and hand-operated speed-changing means and automatically operated speed changing means in said die-spindle connection.

8. The combination of a driving member, a work-spindle, a connection from said driving member to said work-spindle, hand-operated speed-changing means in said work-spindle connection, a cam-shaft, a connection from said driving member to said cam-shaft, hand-operated speed-changing means and automatically operated speed-changing means in said cam-shaft connection, a die-spindle, a connection from said driving member to said die-spindle, and hand-operated speed-changing means and automatically operated speed-changing means in said die-spindle connection.

9. The combination of a driving member, a die-spindle, a connection from said driving member to said die-spindle, a work-spindle, a connection from said driving member to said work-spindle in advance of said die-spindle connection, and hand-operated speed-changing means in said work-spindle connection.

10. The combination of a driving member, a die-spindle, a connection from said driving member to said die-spindle, a work-spindle, a connection from said driving member to said work-spindle in advance of said die-spindle connection, hand-operated speed-changing means in said die-spindle connection, and separate hand-operated speed-changing means in said work-spindle connection.

11. The combination of a driving member, a die-spindle, a connection from said driving member to said die-spindle, automatically operated speed-changing means in said die-spindle connection, a work-spindle, a connection from said driving member to said work-spindle in advance of said speed-changing means in the die-spindle connection, and hand-operated speed-changing means in said work-spindle connection.

12. The combination of a driving member, a die-spindle, a connection from said driving shaft to said die-spindle, automatically operated speed-changing means in said die-spindle connection embodying a shifting clutch, a work-spindle, a connection from said driving member to said work-spindle in advance of said speed-shifting clutch in the die-spindle connection, and hand-operated speed-changing means in said work-spindle connection.

13. The combination of a driving member, a die-spindle, a connection from said driving member to said die-spindle, automatically operated speed-changing means in said die-spindle connection embodying a shifting clutch, a hand-operated speed-changing means in said die-spindle connection beyond said shifting clutch, a work-spindle, a connection from said driving member to said work-spindle in advance of said speed-shifting clutch in the die-spindle connection, and hand-operated speed-changing means in said work-spindle connection.

14. The combination of a spindle-turret, spindles mounted therein, means for advancing and retracting said spindles, and means controlled by the longitudinal movement of said spindles for indexing said turret.

15. The combination of a spindle-turret, spindles mounted therein, means for advancing and retracting said spindles, and means controlled by the retracting movement of said spindles for indexing said turret.

16. The combination of a spindle-turret, spindles mounted therein, means for advancing said spindles, means controlled by the advancing movement of said spindles for retracting said spindles, and means controlled by the longitudinal movement of said spindles for indexing said turret.

17. The combination of a spindle-turret, spindles mounted therein, means for advancing said spindles, means controlled by the advancing movement of said spindles for retracting said spindles, and means controlled by the retracting movement of said spindles for indexing said turret.

18. The combination of a spindle-turret, spindles mounted therein, means for advancing and retracting said spindles, means embodying a clutch for indexing said turret, and means controlled by the longitudinal movement of said spindles for shifting said clutch to effect the indexing of said turret.

19. The combination of a spindle-turret, spindles mounted therein, means for advancing and retracting said spindles, means embodying a clutch for indexing said turret, means for holding said clutch out of engagement, and means controlled by the longitudinal movement of said spindles for releasing said clutch to effect the indexing of said turret.

20. The combination of a spindle-turret, spindles mounted therein, means for advancing and retracting said spindles, and adjustable means controlled by the longitudinal movement of the spindles for indexing said turret, whereby the time of such indexing may be varied.

21. The combination of a spindle-turret, spindles mounted therein, means for advancing and retracting said spindles, a clutch for indexing said turret, a lever for controlling the position of said clutch, and a pivoted dog arranged to travel longitudinally with said spindles for actuating said clutch-lever.

22. The combination of a spindle-turret, spindles mounted therein, means for advancing and retracting said spindles, a clutch for indexing said turret, a lever for controlling the position of said clutch, and a pivoted dog arranged to travel longitudinally with said spindles for actuating said clutch-lever, said dog being adapted to be turned to a position where it will not engage said clutch-lever.

23. The combination of a spindle-turret, spindles mounted therein, means for advancing and retracting said spindles, means controlled by the retracting movement of said spindles for indexing said turret, and means for preventing the indexing of said turret when said spindles are in their advanced position.

24. The combination of a spindle-turret, spindles mounted therein, means for advancing and retracting said spindles, a clutch for indexing said turret, means controlled by the retracting movement of said spindles for shifting said clutch, and means for preventing the shifting of said clutch when said spindles are in their advanced position.

25. The combination of a spindle-turret, spindles mounted in said turret, an adjustable cam controlling the advancing and retracting movements of said spindles, and means controlled by the longitudinal movements of said spindles for indexing said turret, whereby the adjustment of said cam will serve to vary not only the time when said spindles will be advanced, but also the time when said turret will be indexed.

26. The combination of a spindle-turret, spindles mounted therein, means for advancing and retracting said spindles, a clutch for indexing said turret, a dog arranged to travel longitudinally with said spindles, a lever adapted to be actuated by said dog for controlling the position of said clutch, and a yielding connection between said lever and said clutch.

27. The combination of a spindle-turret, spindles mounted therein, means for advancing and retracting said spindles, a clutch for indexing said turret, a dog arranged to travel longitudinally with said spindles, a lever adapted to be actuated by said dog for controlling the position of said clutch, means for preventing the operation of said lever when the spindles are in their advanced position, and a yielding connection between said lever and said clutch.

28. The combination of a spindle-turret, spindles mounted therein, means for advancing and retracting said spindles, a clutch for indexing said turret, means for holding said clutch out of engagement, means controlled by the longitudinal movement of said spindles for releasing said clutch, and means for preventing the release of said clutch when the spindles are in their advanced position.

29. The combination of a work-spindle, a feed-tube for feeding a rod of stock through said spindle, a feed-lever for operating said feed-tube, means for actuating said feed-lever, and means for automatically connecting said feed-lever with said feed-tube.

30. The combination of a turret, a series of work-spindles mounted in said turret, a series of feed-tubes in said spindles, means for indexing said turret, a feed-lever for operating each of said feed-tubes in turn as the turret is indexed, means for actuating said feed-lever, and means for automatically connecting said feed-lever with each of said feed-tubes.

31. The combination of a turret, a series of work-spindles mounted in said turret, a series of feed-tubes in said spindles, means for indexing said turret, a feed-lever for operating each of said feed-tubes in turn as the turret is indexed, means for actuating said feed-lever, and means for automatically connecting said feed-lever with each of said feed-tubes in their advanced position.

32. The combination of a work-spindle, a feed-tube for feeding a rod of stock through said spindle, said feed-tube being provided with an engaging collar having a beveled flange, a feed-lever for operating said feed-tube, said feed-lever being provided with a yielding pin adapted to ride over said beveled flange and engage said collar, and means for actuating said feed-lever.

33. The combination of a work-spindle, a feed-tube for feeding a rod of stock through said spindle, said feed-tube being provided with an engaging collar having two oppositely beveled flanges, a feed-lever for operating said feed-tube, said feed-lever being provided with a yielding pin adapted to ride over said beveled flanges and engage said collar.

34. The combination of a work-spindle, a feed-tube for feeding a rod of stock through said spindle, a feed-lever for operating said feed-tube, means for actuating said feed-lever, means for varying the extent of movement of said feed-tube, and means for automatically connecting said feed-lever with said feed-tube.

35. The combination of a turret, a series of work-spindles mounted in said turret, a series of feed-tubes in said spindles, means for indexing said turret, a feed-lever for operating each of said feed-tubes in turn as the turret is indexed, means for actuating said feed-lever, means for varying the extent of movement of said feed-lever, and means for automatically connecting said feed-lever with each of said feed-tubes.

36. The combination of a turret, a series of work-spindles mounted in said turret, a series of feed-tubes in said spindles, means for indexing said turret, a feed-lever for operating each of said feed-tubes in turn as the turret is indexed, means for actuating said feed-lever, means for varying the starting point of said feed-lever to vary the extent of feed, and means for automatically connecting said feed-lever with each of said feed-tubes.

37. The combination of a turret, a series of work-spindles mounted in said turret, a series of feed-tubes in said spindles, means for indexing said turret, a feed-lever for operating each of said feed-tubes in turn, means for actuating said feed-lever, means for varying the starting point of said feed-lever without varying the stopping point of said lever to vary the extent of feed, and means for automatically connecting said feed-lever with each of said feed-tubes in their advanced position.

38. The combination of a turret, a series of work-spindles mounted in said turret, a series of feed-tubes in said spindles, means for indexing said turret, a feed-lever for operating each of said feed-tubes in turn, means for actuating said feed-lever, and an annular guard located at the rear of said feed-tubes.

39. The combination of a turret, a series of work-spindles mounted in said turret, a series of feed-tubes in said spindles, means for indexing said turret, a feed-lever for operating each of said feed-tubes in turn, means for actuating said feed-lever, and an adjustable guard located at the rear of said feed-tubes and adapted to be adjusted to a position to serve as a guide for determining the proper rearward position of the feed-tubes.

40. The combination of a turret, a series of work-spindles mounted in said turret, a series of feed-tubes in said spindles, means for indexing said turret, a feed-lever for operating each of said feed-tubes in turn, means for actuating said feed-lever, means for automatically connecting said feed-lever with each of said feed-tubes, and an annular guard located at the rear of said feed-tubes and adapted to serve as an abutment to facilitate the automatic engagement of said feed-lever with said feed-tubes.

41. The combination of a work-spindle, means for feeding a rod of stock through said spindle, a movable stop for limiting the feeding movement of said rod, a cam surface for moving said stop into the path of said rod, and a second cam surface for moving said stop out of the path of said rod, said stop being at all times under the control of said cams.

42. The combination of a turret, a series of work-spindles mounted in said turret, means for indexing said turret, two cross-slides arranged at one side of said turret in conjunction with two different indexed positions thereof, a cam-drum, and independent operative connections between said cam-drum and said cross-slides.

43. The combination of a turret, a series of work-spindles mounted in said turret, means for indexing said turret, two cross-slides arranged in conjunction with two different indexed positions of said turret, one of said cross-slides being arranged to move in a horizontal path and the other in a vertical path, a cam-drum, and independent operative connections between said cam-drum and said cross-slides.

44. The combination of a turret, a series of work-spindles mounted in said turret, means for indexing said turret, two cross-slides arranged one above the other, a cam-drum, a direct connection between said cam-drum and one of said cross-slides, and an independent gear connection between said cam-drum and the other cross-slide.

45. The combination of a turret, a series of work-spindles mounted in said turret, means for indexing said turret, two cross-slides arranged one above the other, one of said cross-slides being adapted to move in a horizontal path and the other in a vertical path, a cam-drum, a direct connection between said cam-drum and said horizontal cross-slide, and an independent gear connection between said cam-drum and said vertical cross-slide.

46. The combination of a turret, a series of work-spindles mounted in said turret, means for indexing said turret, two cross-slides arranged one above the other, one of said cross-slides being adapted to move in a horizontal path and the other in a vertical path, a cam-drum, a direct connection between said cam-drum and said horizontal cross-slide, and an independent gear connection between said cam-drum and said vertical cross-slide, said gear connection embodying a cam-lever provided with a segment gear, a quill-gear, and a rack on said vertical cross-slide.

GEORGE H. NEWTON.

Witnesses:
W. H. THURSTON,
J. H. THURSTON.